United States Patent [19]

Harada et al.

[11] Patent Number: 4,935,889

[45] Date of Patent: Jun. 19, 1990

[54] MULTI-LEVEL DISPLAY FOR SMALL COMPUTER

[75] Inventors: Kouichi Harada; Akira Natsuhara, both of Yamatokoriyama, Japan

[73] Assignee: Sharp Kabushiki Kaisha, Osaka, Japan

[21] Appl. No.: 407,695

[22] Filed: Sep. 14, 1989

Related U.S. Application Data

[63] Continuation of Ser. No. 309,001, Feb. 8, 1989, abandoned, which is a continuation of Ser. No. 204,976, Jun. 8, 1988, abandoned, which is a continuation of Ser. No. 87,983, Aug. 17, 1987, abandoned, which is a continuation of Ser. No. 704,674, Feb. 22, 1985, abandoned.

[30] Foreign Application Priority Data

Mar. 6, 1984 [JP] Japan .................................. 59-43236

[51] Int. Cl.⁵ .............................................. G06F 3/14
[52] U.S. Cl. .............................................. 364/710.14
[58] Field of Search ....................... 364/710.14, 710.08, 364/710.09, 709.12

[56] References Cited

U.S. PATENT DOCUMENTS

| | | | |
|---|---|---|---|
| 4,044,242 | 8/1977 | Laesser | 364/710 |
| 4,138,734 | 2/1979 | Nakata et al. | 364/710 |
| 4,386,412 | 5/1983 | Ito | 364/710 |
| 4,481,598 | 6/1984 | Ishiwata | 364/710 |
| 4,580,235 | 4/1986 | Yanagawa | 364/710 |

*Primary Examiner*—David H. Malzahn
*Attorney, Agent, or Firm*—Flehr, Hohbach, Test, Albritton & Herbert

[57] ABSTRACT

A display system for a compact electronic apparatus uses a multi-level display means with a plurality of display lines. When the result of a computation is not displayed, all these display lines are available for displaying a computation expression. When the result of a computation is desired, that portion of the expression on the line on which the result of the computation is displayed is cleared. As a result, the user may be able to see the entire expression at a single glance and distinction between the expression and the result of the computation is clear so as to prevent misrecognition by the user.

2 Claims, 4 Drawing Sheets

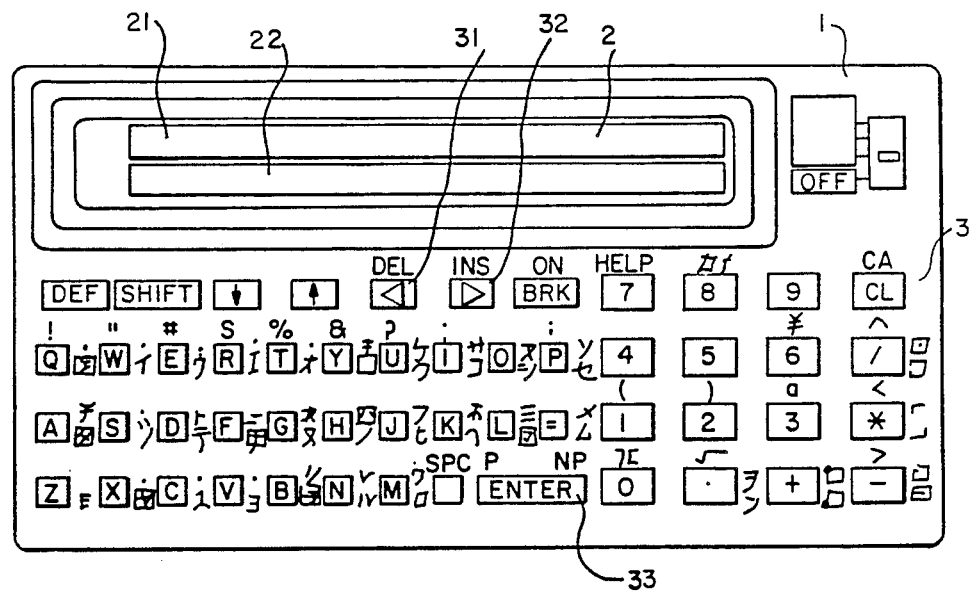
FIG. —1
(1) SIN 30+COS 45    | SIN 30+COS 45- |
(2) [ENT]    | SIN 30 + COS 45 <br> 1.207106781 |
(3) ◁    | SIN 30 + COS 45- |
(4) + TAN 45    | SIN 30 + COS 40 + TAN 45- |
(5) [ENT]    | SIN 30 + COS 40 + TAN 45 <br> 2 207106781 |
FIG. — 2a (1) 1+2+3+---+13   | 1 + 2 + 3 + 4 + 5 + 6 + 7 + 8 + 9 + 10 + 11 + 12 + 13 - |

(2) [ENT]   | 1 + 2 + 3 + 4 + 5 + 6 + 7 + 8 + 9 + 10 + 11 + 12 + 13 = 91 |

(3) [▷]   | [1] + 2 + 3 + 4 + 5 + 6 + 7 + 8 + 9 + 10 + 11 + 12 + 13 |

(4) [0]   | 0 [+] 2 + 3 + 4 + 5 + 6 + 7 + 8 + 9 + 10 + 11 + 12 + 13 |

(5) [ENT]   | 0 + 2 + 3 + 4 + 5 + 6 + 7 + 8 + 9 + 10 + 11 + 12 + 13 = 90 |

(2) [ENT]   | 1 + 2 + 3 + 4 + 5 + 6 + 7 + 8 + 9 + 10 + 11 + 435. |

(3) [▷]   | [ ] + 2 + 3 + 4 + 5 + 6 + 7 + 8 + 9 + 10 + 11 + 12 + 13 + 14 + 15 + 16 + 17 + 18 + 19 + |

(4) [0]   | 0 [+] 2 + 3 + 4 + 5 + 6 + 7 + 8 + 9 + 10 + 11 + 12 + 13 + 14 + 15 + 16 + 17 + 18 + 19 + |

(5) [ENT]   | 0 + 2 + 3 + 4 + 5 + 6 + 7 + 8 + 9 + 10 + 11 + 434. |

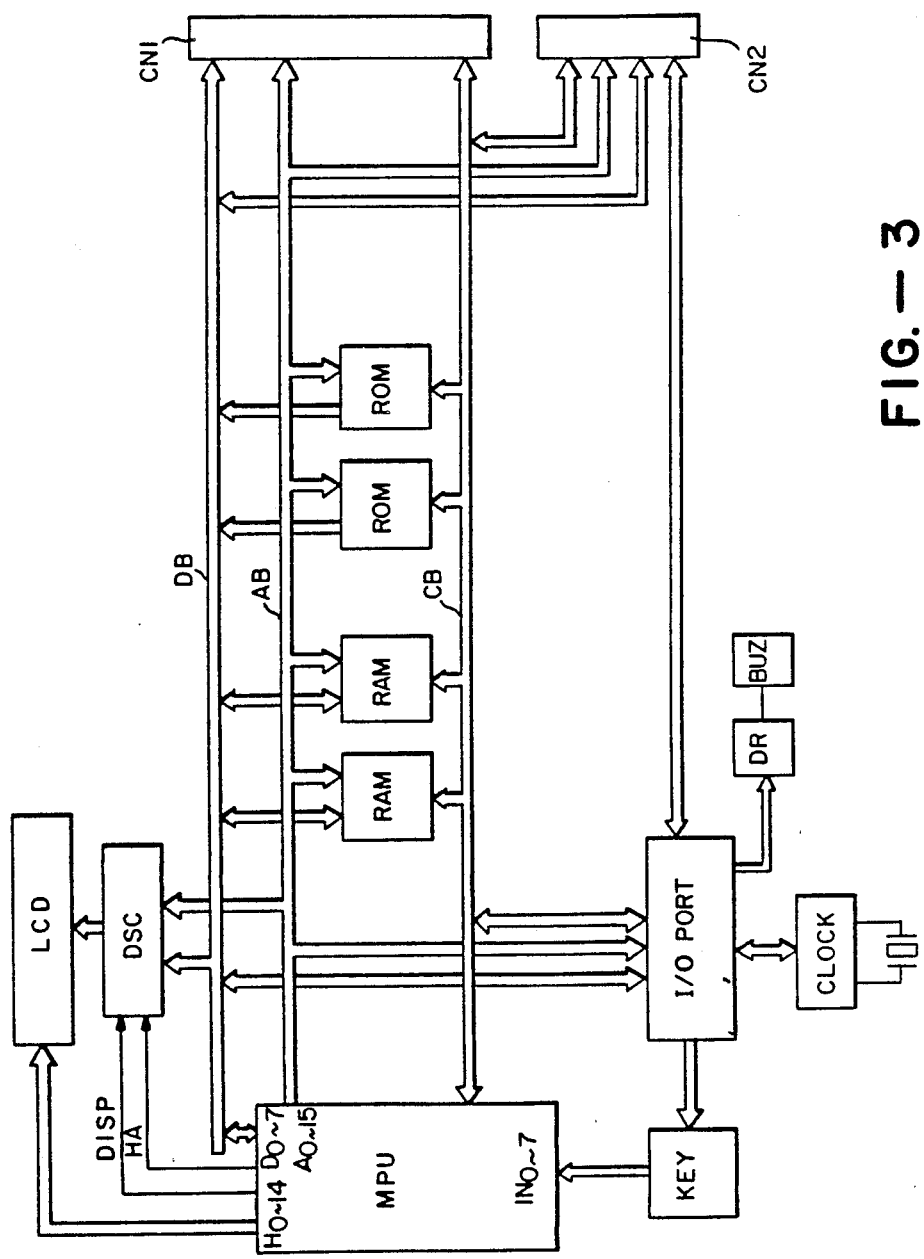
FIG.—3

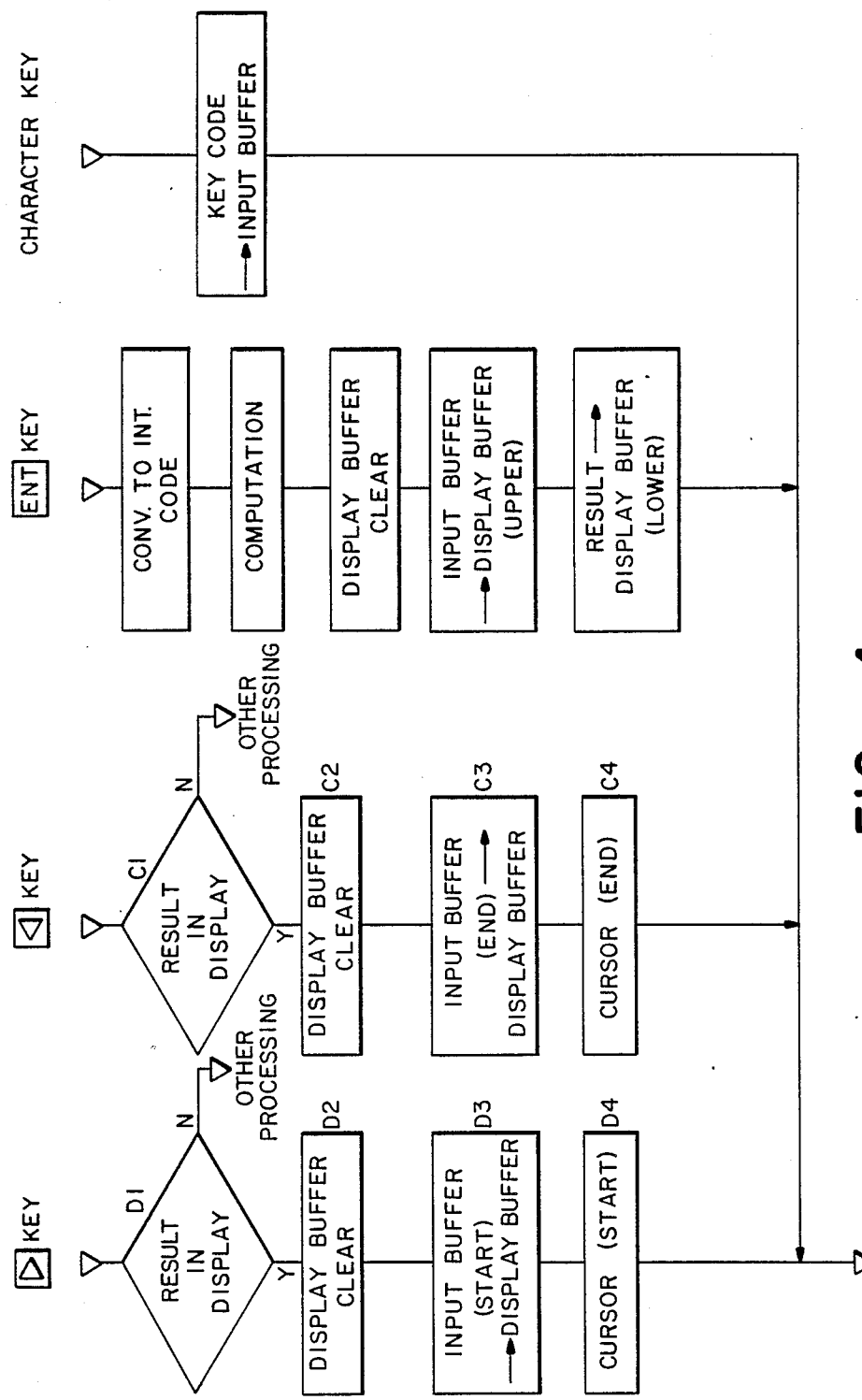
FIG.—4

MULTI-LEVEL DISPLAY FOR SMALL COMPUTER

This is a continuation of application Ser. No. 309,001 filed Feb. 8, 1989, now abandoned, which is a continuation of application Ser. No. 204,976 filed June 8, 1988, now abandoned, which is a continuation of application Ser. No. 087,983 filed Aug. 17, 1987, now abandoned, which is a continuation of application Ser. No. 704,674 filed Feb. 22, 1985, now abandoned.

This invention relates to a display system for a compact electronic apparatus which is adapted to display an arithmetic expression over a plurality of lines especially when it is not displaying a result of a calculation.

When a compact electronic apparatus such as a pocket-size calculator is designed, there is usually a restriction on its size and this necessarily affects its display capacity. For this reason, it is always important to consider in designing such an apparatus how a large amount of information can be displayed with a small display capacity and still be read easily.

There have been available small electronic calculators having a display means with a two-level structure including an upper level and a lower level respectively for displaying, for example, the result of a calculation and an operand. If the arithmetic expression which has been inputted is long and exceeds the number of digits allowed in one line, the expression may have to be shifted and this may cause the user not to be able to look at the entire expression in one glance. On the other hand, if the result of the calculation is caused to be displayed at the same time, the user may find it difficult to determine which is the result of calculation and which is an expression.

It is therefore an object of this invention to eliminate the problems and drawbacks described above by providing a display system for a small electronic apparatus capable of displaying an arithmetic expression efficiently, allowing the user to study the displayed expression in its entirety and preventing mix-ups between an arithmetic expression and a result of a calculation.

FIG. 1 is an external view of a compact calculator using a display system embodying the present invention.

FIGS. 2(a), 2(b) and 2(c) show examples of key operations and displays.

FIG. 3 is an example of system structure diagram.

FIG. 4 is a flow chart for explaining the operation.

In FIG. 1, there is shown a compact calculator of the present invention comprising a housing 1, a display means 2 which includes an upper level section 21 and a lower level section 22 each consisting of a predetermined number of digits (such as a liquid crystal dot matrix display means having a display capacity of two lines of 24 digits each) and a key input section 3, including numeric value keys and function keys. Nos. 31 and 32 are cursor keys ("cursor left" and "cursor right", respectively) and No. 33 is the ENTER key for starting an operation.

FIGS. 2(a)–(c) show examples of key operation procedure and displays in the display means. Referring to FIG. 2(a), an inputted expression SIN30+COS45 is displayed in the upper level section 21 (1). This calculation is carried out when the ENTER key 33 is pressed and the result is displayed in the lower level section 22 (2). If the "cursor left" key 31 is pressed next, the result of the calculation disappears and a cursor is displayed at the end of the expression (3). If +TAN45 is further inputted at this point to make a change in the expression (4) and the ENTER key 33 is pressed again, the result of the new calculation inputted in Step (4) is displayed in the lower level section 22 (5). As shown in Step (2), a blank is adapted to be inserted in the display between a function symbol (such as SIN) and a number (such as 30) as well as between an operator symbol (such as +) and a function symbol (such as COS). This is because the key-inputted contents are compressed into an intermediate code and displayed again. This is the same with the conventional pocket-size calculators.

FIG. 2(b) shows a case where the expression exceeds 24 digits. After the first 24 digits, the key-inputted expression from the 25th digit is displayed in the lower level section 22 (1). When the ENTER key 33 is pressed, however, the result of the operation is displayed in the lower level section 22 (2). In this case, only the first 24 digits of the expression remain displayed in the upper level section 21. If a cursor key is pressed in this condition, the entire expression is displayed over two lines (3). If a number (such as "0") is entered at the cursor position, the number which has these is replaced (4), and the result of the calculation is displayed in the lower level section 22 when the ENTER key 33 is pressed (5). If the "cursor left" key 31 is pressed, a cursor is displayed at the end of the expression (6). In Step (3), the box around "1" indicates a blink display (of "1" in this case).

FIG. 2(c) shows a case where the expression exceeds 48 digits. Subsequent to the key-input of 1+2+3+4+...+18+19+, the content of the lower level section 22 is shifted to and displayed in the upper level section 21 and the display continues from the left-hand side of the lower level section 22 (1). The result of the calculation is again displayed in the lower level section 22 and only the first 24 digits of the expression is displayed in the upper level 21 (2). As in the example explained in connection with FIG. 2(b), a display is made from the beginning of the expression if the "cursor right" key is operated and the cursor itself is displayed at the beginning. If the "cursor left" key is operated, the final two lines of the expression, when partitioned in units of 24 digits from the beginning, are displayed and the cursor is displayed at the end. In summary, an electronic calculator of the present invention can display an expression in the upper level section and the result of the calculation in the lower level section. Moreover, if the expression is longer than the number of digits in one line and if the result of the calculation is not being displayed, the display of the expression can continue over two or more lines. This enables the user to look at the expression and its calculated result at the same time in the display means and also to look at the entered expression when corrections must be made to the expression, for example.

FIG. 3 shows an example of control means for the modes of display described above. The system organization of FIG. 3 includes a display means LCD with a liquid crystal display unit, a display control means DSC which controls the character display or illumination of symbol segments in the display means, a microprocessor unit MPU, and a key input means KEY for inputting key strobe signals from an I/O port (I/O PORT) and outputting key return signals to MPU. Read-write memories RAM are for storing various registers, flags, input buffers, display buffers or programs, while interpreters for executing programs and other control programs are stored in advance in read-only memories ROM. $CN_1$ is a connector for connecting memories RAM and ROM as a module. These memories are connected to an address bus AB, a data bus DB and a control bus CB. The I/O PORT is also connected to these buses and functions as an interface to MPU. The system further includes a buzzer BUZ which is activated by a driver means DR; CLOCK is a clock circuit. The I/O port inputs and outputs signals to and from these I/O units, or it outputs strobe signals to KEY, inputs and outputs time data to and from the clock circuit CLOCK and outputs drive signals to the driver means DR. $CN_2$ is a connector for connecting externally I/O units such as a data recorder and a printer as well as extended memories. The microprocessor unit MPU is adapted to output synchronous signal HA and ON/OFF display signals DISP to the display control section DSC and back plate signals $H_{0-14}$ to the display means LCD. The display control means DSC contains internally display memories in a bit-by-bit correspondence with the individual segments of the display means LCD. In other words, desired characters and symbols can be displayed if a bit pattern corresponding to the display pattern is written in these display memories. The display buffer in the RAM is for storing by character code the contents to be displayed in each digit of the display section and has a capacity for 48 digits. The input buffer, on the other hand, has a capacity for 80 digits and the inputted key code is entered into this input buffer. The contents to be displayed are read from the input buffer and transferred to the display buffer. As for the contents of the display buffer, a decoded result is inputted to a display memory inside the aforementioned display control means DSC by a display routine. FIG. 4 shows a flow chart describing the process routine for each inputted key. When the character key is pressed, its key code is inputted to the input buffer ($A_1$). In other words, if it is an arithmetic expression, it is inputted into the input buffer according to the key operation. When the ENTER key is operated, the content of the input buffer is converted into an intermediate code as explained above and the computation is carried out ($B_1$ and $B_2$). The result of this computation is obtained by a register for temporary storage computation results. The display buffer is cleared thereafter ($B_3$); the content of the input buffer is transferred sequentially from the beginning into that area in the display buffer which corresponds to the upper level section of the display means ($B_4$); and the content of the register for storing the computation result is transferred into that area in the display buffer which corresponds to the lower level section of the display means ($B_5$). If the "cursor right" key 32 is operated after the content to be displayed is entered into the display buffer as described above, the display buffer is cleared first ($D_1$ and $D_2$) and the content is transferred sequentially from the beginning of the input buffer into the display buffer ($D_3$). The cursor is then positioned at the beginning ($D_4$). If the "cursor left" key 31 is operated, on the other hand, the content of the display buffer is cleared first ($C_1$ and $C_2$) and the final two lines of the content of the input buffer, when it is partitioned in units of 24 digits from its beginning, are sequentially transferred into the display buffer ($C_3$). This is followed then by the positioning of the cursor at its end ($C_4$).

In summary, a display means of this invention can display a computation expression over two or more lines when the result of this computation is not being displayed. Thus, a larger number of digits can be used to display it and, hence, a larger portion of the desired expression can be displayed so that the user may be able to see the entire expression at a glance. This makes corrections of such expressions much easier. When the result of a computation is displayed, furthermore, the line on which the result is displayed is cleared. This makes the distinction clearer between the computation expression and the computed result, preventing misrecognition by the user.

The present invention has been described in terms of only one embodiment above but it is to be understood that the scope of the invention is limited only by the following claims.

What is claimed is:

1. A display system for a compact electronic apparatus, said system comprising
   an input means including a plurality of formula-inputting keys for inputting an arithmetic expression and an enter key,
   a multi-level display means having a predetermined plural number of columns and a plurality of lines including a top line and a bottom line, and
   programmed control means for
   examining whether said enter key has been operated,
   sequentially displaying on said display means from the leftmost column of said top line an arithmetic expression inputted through said formulainputting keys if said enter key is not operated, and
   computing to obtain a numerical result of said inputted arithmetic expression, clearing displays only from said bottom line and displaying said numerical result on the rightmost columns of said bottom line if said enter key is operated after said arithmetic expression is inputted through said formula-inputting keys.

2. The display system of claim 1 wherein said input means further includes a clear key and said control means serves to clear said display means of said result and to cause said arithmetic expression inputted through said formula-inputting keys to be displayed on said display means if said clear key is operated while said result is displayed on said display means.

* * * * *